(12) United States Patent
Ikeda et al.

(10) Patent No.: US 7,546,613 B2
(45) Date of Patent: Jun. 9, 2009

(54) METHODS AND SYSTEMS FOR EFFICIENT QUEUE PROPAGATION USING A SINGLE PROTOCOL-BASED REMOTE PROCEDURE CALL TO STREAM A BATCH OF MESSAGES

(75) Inventors: Nancy Reiko Ikeda, Los Altos Hills, CA (US); Ashwinder Singh Ahluwalia, Fremont, CA (US); Chao Liang, Fremont, CA (US); Krishnan Meiyyappan, Fremont, CA (US); Sreenivas Gollapudi, Cupertino, CA (US); Lakshminarayanan Chidambaran, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 969 days.

(21) Appl. No.: 10/942,118

(22) Filed: Sep. 14, 2004

(65) Prior Publication Data

US 2006/0056413 A1    Mar. 16, 2006

(51) Int. Cl.
*G06F 3/00* (2006.01)
*G06F 9/46* (2006.01)
(52) U.S. Cl. .................. 719/330; 718/101; 719/313
(58) Field of Classification Search .............. 707/1–10; 719/313–315, 330; 718/101
See application file for complete search history.

(56) References Cited

U.S. PATENT DOCUMENTS

| | | | |
|---|---|---|---|
| 5,721,904 A * | 2/1998 | Ito et al. ................... | 707/8 |
| 5,878,056 A * | 3/1999 | Black et al. .............. | 714/748 |
| 5,926,636 A * | 7/1999 | Lam et al. ................ | 719/313 |
| 5,950,188 A * | 9/1999 | Wildermuth .............. | 707/3 |
| 6,324,567 B2 | 11/2001 | Chidambaran et al. | |
| 6,397,352 B1 | 5/2002 | Chandrasekaran et al. | |
| 6,453,360 B1 * | 9/2002 | Muller et al. ............. | 709/250 |
| 6,675,195 B1 | 1/2004 | Chatterjee et al. | |
| 7,318,075 B2 * | 1/2008 | Ashwin et al. ............ | 707/203 |
| 2002/0091853 A1 * | 7/2002 | Moore et al. ............. | 709/236 |

(Continued)

OTHER PUBLICATIONS

Oracle 9i Application Developer's Guide—Advanced Queuing, vol. 2, Release 2 (9.2), Mar. 2002, Part No. A96589-01, (17-1-17-72; 18-1-18-48; A1-A88; E1-E10).

(Continued)

*Primary Examiner*—Li B Zhen
*Assistant Examiner*—Charles E Anya
(74) *Attorney, Agent, or Firm*—Young Law Firm, P.C.

(57) ABSTRACT

A computer-implemented method of streaming a plurality of messages from a source queue to at least one destination queue over a computer network. The method may include steps of generating a remote procedure call, the remote procedure being configured to encapsulate at least header data, message data for each of the plurality of messages and an end of batch token, the header data being common to each of the plurality of messages and including an identification of the at least one destination queue, the end of batch token signaling that no further message data follows; sending the generated remote procedure call over the computer network to the destination queue identified in the header data, and dequeueing at least the message data for each of the plurality of messages from the source queue and streaming the dequeued messages over the network, and successively enqueueing each streamed message data into the at least one destination queue identified by the header data until the end of batch token is received.

14 Claims, 5 Drawing Sheets

U.S. PATENT DOCUMENTS

2004/0133644 A1* 7/2004 Warren et al. ............... 709/206
2005/0080930 A1* 4/2005 Joseph ....................... 709/248
2006/0265510 A1* 11/2006 Warren et al. ............... 709/230

OTHER PUBLICATIONS

AIX Version 4.3 Communications Programming Concepts, "Broadcasting a Remote Procedure Call Example", http://post.doit.wisc.edu/library/techlib/manuals/adoclib/aixprggd/progcomc/rpcbroad.htm, printed Jun. 14, 2006, 1pg.

AIX Version 4.3 Communications Programming Concepts,"Converting Local Procedures into Remote Procedures Example", http://post.doit.wisc.edu/library/techlib/manuals/adoclib/aixprggd/progcomc/rpcconve.htm, printed Jun. 14, 2006, 5pgs.

AIX Version 4.3 Communications Programming Concepts,"DES Authentication Example", http://post.doit.wisc.edu/library/techlib/manuals/adoclib/aixprggd/progcomc/rpcdesex.htm, printed Jun. 14, 2006, 3pgs.

AIX Version 4.3 Communications Programming Concepts,"Generating XDR Routines Example", http://post.doit.wisc.edu/library/techlib/manuals/adoclib/aixprggd/progcomc/rpcxdrex.htm, printed Jun. 14, 2006, 4pgs.

Brian N. Bershad et al., "Lightweight Remote Procedure Call", ACM Transactions on Computer Systems, 8(1), Feb. 1990.

AIX Version 4.3 Communications Programming Concepts,"List of RPC Programming References", http://post.doit.wisc.edu/library/techlib/manuals/adoclib/aixprggd/progcomc/rpcref.htm, printed Jun. 14, 2006, 5pgs.

AIX Version 4.3 Communications Programming Concepts,"Programming in RPC", http://post.doit.wisc.edu/library/techlib/manuals/adoclib/aixprggd/progcomc/rpcprog.htm, printed Jun. 14, 2006, 8pgs.

AIX Version 4.3 Communications Programming Concepts,"RPC Authentication", http://post.doit.wisc.edu/library/techlib/manuals/adoclib/aixprggd/progcomc/rpcauth.htm, printed Jun. 14, 2006, 8pgs.

AIX Version 4.3 Communications Programming Concepts,"RPC Callback Procedures Example", http://post.doit.wisc.edu/library/techlib/manuals/adoclib/aixprggd/progcomc/rpccallb.htm, printed Jun. 14, 2006, 4pgs.

AIX Version 4.3 Communications Programming Concepts,"RPC Features", http://post.doit.wisc.edu/library/techlib/manuals/adoclib/aixprggd/progcomc/rpcfeat.htm, printed Jun. 14, 2006, 3pgs.

AIX Version 4.3 Communications Programming Concepts, "rpcgen Protocol Compiler", http://post.doit.wisc.edu/library/techlib/manuals/adoclib/aixprggd/progcomc/rpccompl.htm, printed Jun. 14, 2006, 3pgs.

AIX Version 4.3 Communications Programming Concepts,"RPC Language", http://post.doit.wisc.edu/library/techlib/manuals/adoclib/aixprggd/progcomc/rpclang.htm, printed Jun. 14, 2006, 7pgs.

AIX Version 4.3 Communications Programming Concepts,"RPC Language ping Program Example", http://post.doit.wisc.edu/library/techlib/manuals/adoclib/aixprggd/progcomc/rpcpinge.htm, printed Jun. 14, 2006, 1pg.

AIX Version 4.3 Communications Programming Concepts,"RPC Message Protocol", http://post.doit.wisc.edu/library/techlib/manuals/adoclib/aixprggd/progcomc/rpcmsg.htm, printed Jun. 14, 2006, 5pgs.

AIX Version 4.3 Communications Programming Concepts,"RPC Port Mapper Program", http://post.doit.wisc.edu/library/techlib/manuals/adoclib/aixprggd/progcomc/rpcportm.htm, printed Jun. 14, 2006, 4pgs.

AIX Version 4.3 Communications Programming Concepts,"Chapter 8. Remote Procedure Call", http://post.doit.wisc.edu/library/techlib/manuals/adoclib/aixprggd/progcomc/ch8rpc.htm, printed Jun. 14, 2006, 2pgs.

AIX Version 4.3 Communications Programming Concepts,"RPC Model", http://post.doit.wisc.edu/library/techlib/manuals/adoclib/aixprggd/progcomc/rpcmod.htm, printed Jun. 14, 2006, 2pgs.

AIX Version 4.3 Communications Programming Concepts,"rep Process on TCP Example", http://post.doit.wisc.edu/library/techlib/manuals/adoclib/aixprggd/progcomc/rcptcpex.htm, printed Jun. 14, 2006, 4pgs.

AIX Version 4.3 Communications Programming Concepts,"Showing How RPC Passes Arbitrary Data Types Example", http://post.doit.wisc.edu/library/techlib/manuals/adoclib/aixprggd/progcomc/rpcarbda.htm, printed Jun. 14, 2006, 2pgs.

AIX Version 4.3 Communications Programming Concepts,"Using Multiple Program Versions Example", http://post.doit.wisc.edu/library/techlib/manuals/adoclib/aixprggd/progcomc/rpcmultv.htm, printed Jun. 14, 2006, 2pgs.

AIX Version 4.3 Communications Programming Concepts, "Using the Highest Layer of RPC Example", http://post.doit.wisc.edu/library/techlib/manuals/adoclib/aixprggd/progcomc/rpchighe.htm, printed Jun. 14, 2006, 1pg.

AIX Version 4.3 Communications Programming Concepts,"Using the Intermediate Layer of RPC Example", http://post.doit.wisc.edu/library/techlib/manuals/adoclib/aixprggd/progcomc/rpcinter.htm, printed Jun. 14, 2006, 2pgs.

AIX Version 4.3 Communications Programming Concepts,"Using the Lowest Layer of RPC Example", http://post.doit.wisc.edu/library/techlib/manuals/adoclib/aixprggd/progcomc/rpclowes.htm, printed Jun. 14, 2006, 5pgs.

AIX Version 4.3 Communications Programming Concepts,"Using the select Subroutine Example", http://post.doit.wisc.edu/library/techlib/manuals/adoclib/aixprggd/progcomc/rpcselec.htm, printed Jun. 14, 2006, 1pg.

AIX Version 4.3 Communications Programming Concepts,"Using UNIX Authentication Example", http://post.doit.wisc.edu/library/techlib/manuals/adoclib/aixprggd/progcomc/rpcunixa.htm, printed Jun. 14, 2006, 3pgs.

An Oracle Technical White Paper "Message Queuing for the Modern World", pp. 1-14 (Jun. 2002).

Oracle 8i Application Developer's Guide—Advanced Queuing Release 8.1.5, A68005-01, Chapters 1, 2, and 3 (printed May 12, 2004).

Deiter Gawlick, "Message Queuing for Business Integration" eAI Journal, pp. 30-33 (Oct. 2002).

Ritu Singal, "Advanced Queuing in Oracle" TATA Consultancy Services (Feb. 2003).

Oracle, "1 Introducing Oracle Streams AQ", https://cwisdb.cc.kuleuven.ac.be/ora10doc/server.101/b10785/aq_intro.htm, 31 pgs. (printed Aug. 4, 2004).

* cited by examiner

METHODS AND SYSTEMS FOR EFFICIENT QUEUE PROPAGATION USING A SINGLE PROTOCOL-BASED REMOTE PROCEDURE CALL TO STREAM A BATCH OF MESSAGES

BACKGROUND OF THE INVENTION

1. Field of the Invention

The present inventions relate generally to methods and systems for efficient streaming of messages from a source queue to a destination queue.

2. Description of the Prior Art and Related Information

Applications may communicate with each other via the transmission and receipt of messages. For example, a message may be transmitted from one queue in one database and received in another queue in another database. Message propagation involves sending data between source and destination queues. Messages are conventionally dequeued from a source queue one by one and enqueued in a destination queue one by one. When the destination queue resides on a different node, data must be encapsulated in a remote procedure call (RPC) that executes on the destination node. RPC is a powerful technique for constructing distributed applications. By using remote procedure calls, programmers of distributed applications avoid the details of the interface with the network, as the RPC isolates the application from the physical and logical elements of the data communications mechanism and allows the application to use a variety of transports. An RPC is similar to a function call. Like a function call, when an RPC is made, the calling arguments are passed to the remote procedure and the caller waits for a response to be returned from the remote procedure. The client makes a procedure call that sends a request to the server and waits. When the request arrives, the server calls a dispatch routine that performs the requested service, and sends the reply to the client. After the RPC call is completed, the client program continues.

FIG. 1 shows the structure of a conventional RPC. As shown, the remote procedure call 100 includes at least metadata 102, a function name 104, in arguments 106 to the function identified by the function name 104 and out arguments 108 returned by the function name 104. The metadata 102 represents overhead to the RPC 100, whereas the function name 104, the in argument 106 and the out argument 108 forms part of the payload of the RPC 100. It may be appreciated that, if the metadata is the same across several RPCs, repeatedly sending the same metadata to the destination side is redundant and inefficient.

FIG. 2 shows a conventional method of sending a plurality of RPCs between source queues and destination queues. As shown, a first application 202 sends a plurality of messages from a source queue 206 to destination queues 208, 210 accessible to a second application 204 (the ultimate consumer of the messages). The applications may reside on the same or different databases. Each of the messages may be successively dequeued from the source queue Q1 206, encapsulated into separate RPCs by a propagator process (not shown), and sent to its destination queue or queues. In FIG. 2, the destination for RPC 212, 214 and 216 is Q2 208, whereas the destination for RPC 218 and RPC 220 is Q3 210. Conventionally, each message is encapsulated within a separate RPC, as shown at 212-218. After executing the function called for by the RPC, the destination becomes the source and the result of the RPC is called back to the original source of the RPC, as indicated in FIG. 2 by the arrows from the destination back to the source.

As implicit in FIG. 2, propagating a batch of n messages conventionally requires the formation, sending and execution of n RPCs. That is, conventional messaging techniques and propagation architectures require a separate RPC for each message to be enqueued at the destination queue in the same or another database. It may be appreciated that sending n separate RPCs results in an inefficient use of system resources. Basic system resources include the client, the network and the server. When a client prepares a single RPC, the server and the network connection between the client and server sit idle. When the client sends the RPC over the network, the client and server sit idle. When the server processes the RPC, the client and the network connection between the client and server sit idle. Indeed, associated with each message that is sent to its destination, a call stack is executed to carry out the enqueue operation and this call stack is re-executed for each message that is to be enqueued at the destination. When the response is transmitted to the client over the network, both the server and client sit idle. As a result of these serial inefficiencies, the throughput of the system (that is, the number of requests for service processed in a given amount of time) is low. Moreover, if multiple queues in the target database are each to receive the message, a separate copy of the message (one RPC per message enqueued) must be sent to each of the multiple queues in the target database. A side effect of executing multiple RPCs is reduced data sharing, in that messages and the messages' overhead that are to be propagated to multiple destination queues must be transmitted repeatedly, as conventional messaging schemes do not provide for any mechanism to share data between remote message enqueues. For example, when multiple messages are propagated to the same destination queue, the message's metadata is transmitted repeatedly. For persistent queue propagation, each RPC translates into a separate Structured Query Language (SQL) insert statement, each of which consumes limited CPU resources at the destination side.

From the foregoing, it is clear that methods and systems are needed to more efficiently send data between source and destination queues. More specifically, what are needed are methods and systems for more efficiently sending multiple messages from a source queue to a destination queue. Also needed are methods and systems to more efficiently propagate messages to multiple destination queues. That is, what are needed are methods and systems that do not require each message to be encapsulated in a separate RPC for propagation from a source queue to one or more destination queues.

SUMMARY OF THE INVENTION

Embodiments of the present invention include a computer-implemented remote procedure call configured to enable a stream of a plurality of messages to be sent from a source queue accessible by a first computer application to one or more selected remote destination queues accessible to a second computer application over a computer network. According to one embodiment, the remote procedure call includes a first message header indicator, the first message header indicator being configured to signal that an identity of a first destination queue for messages to be streamed follows; first header data configured to identify the first destination queue; a first message body indicator, the first message body indicator being configured to signal that a first message to be streamed to the first destination queue follows; first message data, the first message data including the first message to be streamed to the first destination queue identified by the first header data; a second message body indicator, the second message body indicator being configured to signal that a second message to be streamed follows; second message data, the second message data including the second message to be streamed, and an end of batch token, the end of batch token signaling the end of the stream of the plurality of messages.

The remote procedure call may be configured to stream the second message to the first destination queue. The remote procedure call may be configured to stream the second message to a second destination queue. The remote procedure call may further include a second message header indicator, the second message header indicator being disposed between the first message data and the second message body indicator, the second message header indicator being configured to signal a change in destination queue for the second message, and second header data configured to identify the second destination queue to which the second message may be to be streamed. The remote procedure call may further include a second message header indicator disposed before the end of batch token, the second message header indicator being configured to signal a change in destination queue for messages to follow; second header data configured to identify a second destination queue, and a same message indicator, the same message indicator indicating that an immediately preceding message data may be to be streamed to the second destination queue identified by the second header data.

According to another embodiment thereof, the present invention is also a machine-readable medium having data stored thereon representing sequences of instructions which, when executed by a computing device, causes the computing device to generate a remote procedure call configured to enable a stream of a plurality of messages to be sent from a source queue accessible by a first computer application to one or more selected remote destination queues accessible to a second computer application over a computer network, the remote procedure call comprising: a first message header indicator, the first message header indicator being configured to signal that an identity of a first destination queue for messages to be streamed follows; first header data configured to identify the first destination queue; a first message body indicator, the first message body indicator being configured to signal that a first message to be streamed to the first destination queue follows; first message data, the first message data including the first message to be streamed to the first destination queue identified by the first header data; a second message body indicator, the second message body indicator being configured to signal that a second message to be streamed follows; second message data, the second message data including the second message to be streamed, and an end of batch token, the end of batch token signaling the end of the stream of the plurality of messages.

The remote procedure call may be configured to stream the second message to the first destination queue. The remote procedure call may be configured to stream the second message to a second destination queue. The remote procedure call may include a second message header indicator, the second message header indicator being disposed between the first message data and the second message body indicator, the second message header indicator being configured to signal a change in destination queue for the second message, and second header data configured to identify the second destination queue to which the second message may be to be streamed. The machine-readable medium may further include a second message header indicator disposed before the end of batch token, the second message header indicator being configured to signal a change in destination queue for messages to follow; second header data configured to identify a second destination queue; a same message indicator, the same message indicator indicating that an immediately preceding message data may be to be streamed to the second destination queue identified by the second header data.

According to another embodiment thereof, the present invention is a computer-implemented method of streaming a plurality of messages from a source queue to at least one destination queue over a computer network, each of the plurality of messages including metadata and message data. The method may include steps of generating a remote procedure call, the remote procedure being configured to encapsulate at least header data, message data for each of the plurality of messages and an end of batch token, the header data being common to each of the plurality of messages and including an identification of the at least one destination queue, the end of batch token signaling that no further message data follows; sending the generated remote procedure call over the computer network to the destination queue identified in the header data; beginning execution of the remote procedure call by invoking a SQL engine and initiating a single insert statement to enqueue each of the streamed message data into the at least one destination queue identified by the header data, and dequeueing at least the message data for each of the plurality of messages from the source queue and streaming the dequeued messages over the network, and successively enqueueing each streamed message data into the at least one destination queue identified by the header data until the end of batch token may be received.

The computer-implemented method may further include a step of configuring the remote procedure call so as to include only one copy of a message data that may be to be sent to more than one destination queue. A step may be carried out to configure the remote procedure call such that a message header indicator and header data precedes each group of message data to be streamed to a same destination queue. The streaming step may be carried out only after the SQL engine has been invoked and the single insert statement initiated. The method may further include a step of including executing a callback to carry out a row insert for each streamed message data. In this manner, memory is re-used. The callback will read the streamed message directly into the SQL buffer, which obviates the need to materialize the plurality of messages up front. The number of message data streamed to the destination may be unknown to the destination queue until the end of batch token is received.

DETAILED DESCRIPTION

Figure 1:
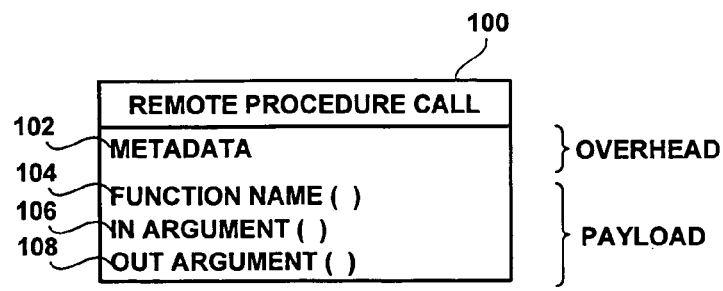
FIG. 1 shows a database system employing messaging and queueing with which embodiments of the present invention may be practiced.
Figure 2:
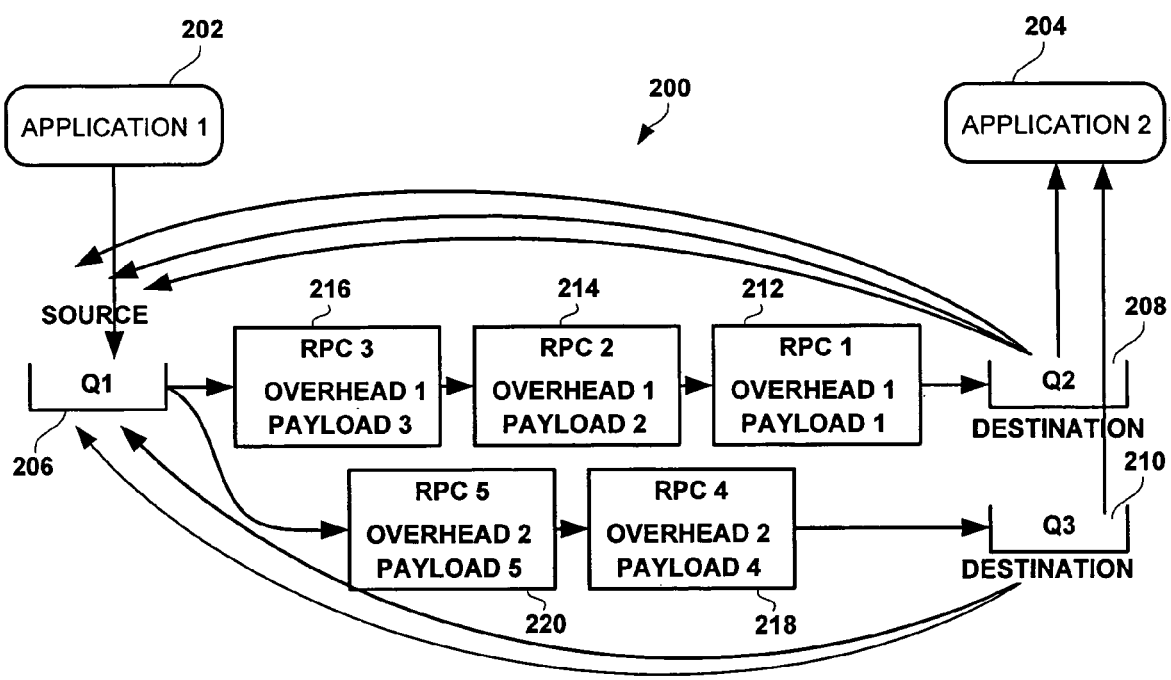
FIG. 2 shows the structure of a conventional RPC.
Figure 3:
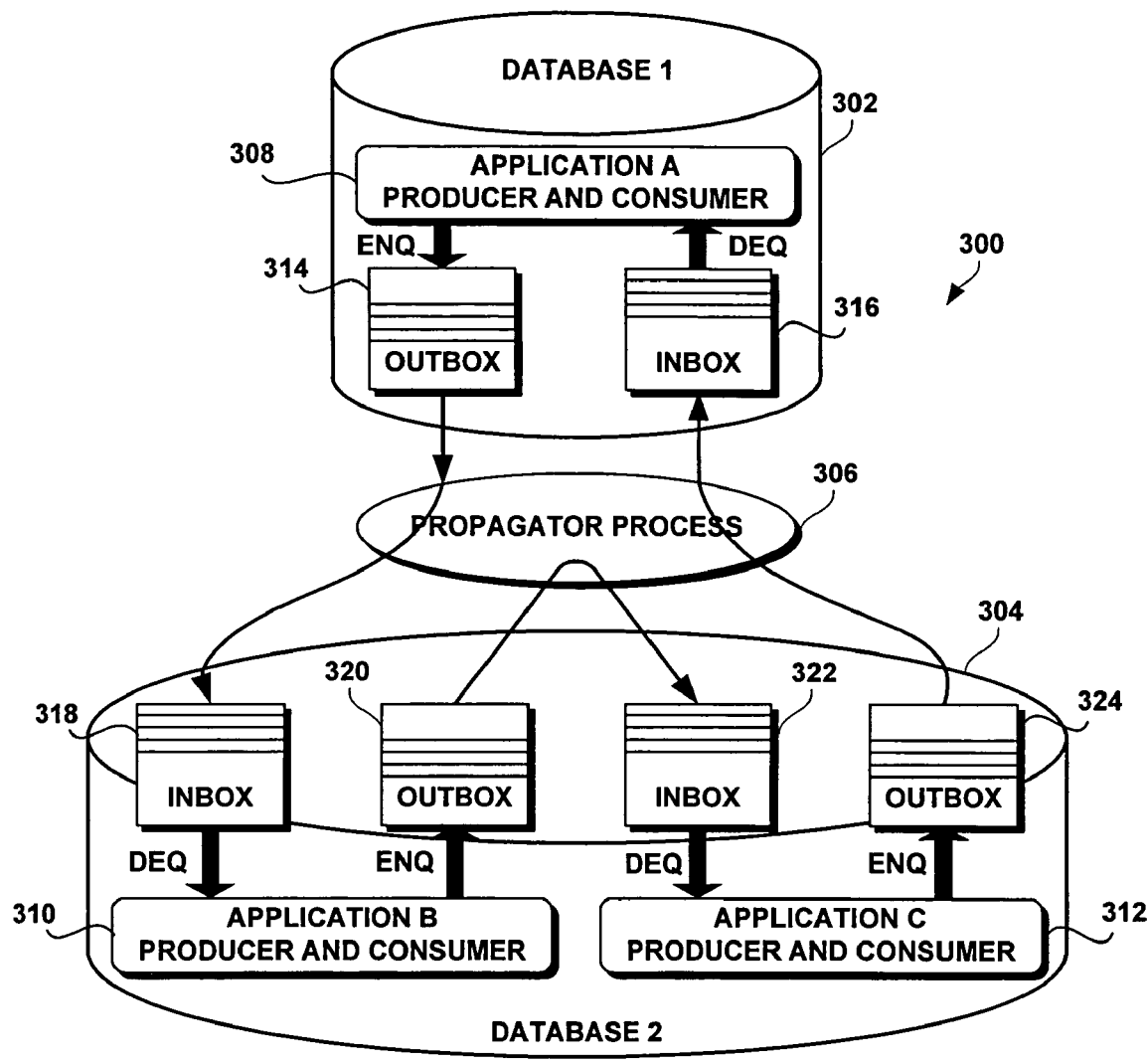
FIG. 3 shows a conventional method of sending a plurality of RPCs between a source queue and destination queues.

FIG. 3 shows a database system 300 employing messaging and queueing with which embodiments of the present invention may be practiced. As shown, the system 300 includes a first database 302 and a second database 304. Applications A, B and C, shown at 308, 310 and 312 respectively, may communicate with one another using a messaging protocol such as disclosed herein as well as, for example, Oracle Streams Advanced Queueing (AQ), which is incorporated herein by reference. Each application may produce and consume messages. That is, each application may be a source or a destination of such messages, and may act as either a client or a server relative to the application with which it is communicating. Each application 308, 310 and 312 may have an inbox (a queue configured for handling incoming messages) as shown at 316, 318 and 322 respectively. Similarly, each application 308, 310 and 312 may have an outbox (a queue configured for handling outgoing messages) as shown at 314, 320 and 324, respectively. Whenever an application enqueues a message (inserts a message into the queue), the incoming message goes into it's outbox regardless of the message destination. Messages sent locally (on the same node) and messages sent remotely (on a different node) all go in the outbox. Similarly, an application dequeues messages from its inbox no matter where the message originates. The propagator process 306, intermediates such interchanges, treating all messages on the same basis. When the propagator dequeues a message, it does so from an application's outbox, encapsulates it into an RPC, and sends it to another application's inbox, where the message will be enqueued.

Embodiments of the present invention improve the performance of message propagation by defining a new propagation protocol, which protocol is driven by the propagation source. This new protocol is capable of streaming messages to destination queues in a very efficient manner. According to an embodiment of the present invention, a single RPC may be initiated by a propagator process (such as the assignee's own AQ Propagator, for example), the single RPC being capable of enqueuing a batch of messages to a single queue or to multiple destination queues. In this manner, embodiments of the present invention utilize a single RPC to stream a plurality of messages, thereby reducing the instruction count required to propagate messages by replacing the conventional train of separate RPCs by a single RPC. The byte count transmitted over the network is reduced. Redundant data such as common metadata is detected by the propagation source and is no longer sent to the destination. Indeed, according to an embodiment of the present invention, metadata that is common across messages that are to be propagated to the destination side is consolidated and the messages that share common metadata are then streamed to the destination side under the control of the source. Memory is utilized more efficiently by re-using a single message buffer on both the source and destination sides. During message propagation, only one RPC is initiated, therefore per-message memory is re-used.

The protocol may be configured as an open-ended master-slave protocol (in which the destination is the slave and the source of the messages the master) that is implemented underneath the new RPC to stream multiple messages between a source queue and multiple destination queues. According to an embodiment of the present invention, the protocol may include the use of status messages, message headers and message bodies. Status messages may include a single byte indicating the type of data to follow, message headers may include meta-data including the queue name and the type of queue, and the message bodies may include the actual message and the recipient or the list of the recipients to receive the message or messages.

The propagation source may drive the new protocol by sending the status messages, message headers and message bodies to the destination side. The destination side only reacts to the data it receives and ultimately enqueues the messages into the specified queue or queues. Although the status messages discussed herein are referred to as status bytes, it is understood that these status messages need not be a single byte, but may be messages of any length, keeping in mind the desirability to minimize all non-message data information sent to the remote side queue or queues. Separate status messages may be configured for at least the following scenarios:

The propagation source detects when the destination queue name changes and sends the message header information;

The propagation source detects when multiple messages are destined for the same remote queue. It sends the message header only once followed by multiple message bodies;

The propagation source detects when the same message will be propagated to multiple remote queues. A special status message instructs the destination side to re-use the previous message body. Thus, the message body need only be sent once, and The propagation source advantageously controls the propagation batch size. The remote side may then continue to read and process status messages and data until it receives an end-of-batch token from the source.

According to an embodiment of the present invention, therefore, the source side may drive the actions of the destination by sending selected ones the above-listed status bytes (and/or other status bytes, flags indicators or tokens) to indicate to the destination what action should be taken and the nature of the information that immediately follows the status bytes. The sequence of messages may be determined based on the properties of the dequeued message. The following exemplary status bytes may be sent, it being understood the list below is exemplary in nature and that other such status bytes may be developed and used within the context of the present invention:

MsgHdr: This status byte indicates the destination queue name or a change in the destination queue name for the message contained in the message following the MsgBody status byte. According to one embodiment, this MsgHdr status byte always initiates each batch of messages. For client-server enqueue of a plurality of messages, as queue changes may not be supported, only one 'MsgHdr' message need be sent. For persistent propagation, a 'MsgHdr' message need be sent only if the destination queue name changes.

MsgBody: This status byte indicates that a message body will follow. The message body proper may include enqueue options, message properties and the actual message payload.

SameMsg: This status byte indicates that the previous message body should be used. Conventionally, messages destined for more than one remote queue on the same node are re-transmitted in separate RPCs. According to embodiments of the present invention, however, the source side need send only the 'SameMsg' status byte when it determines that the same message is to be enqueued to a different remote queue.

EndOfBatch: This is a token that indicates an end of a stream of messages. That is, according to an embodiment of the present invention, when all the messages in a batch or stream have been sent, an EndOfBatch token or similar flag or status byte may be sent, which effectively terminates the enqueue batch.

Figure 4:
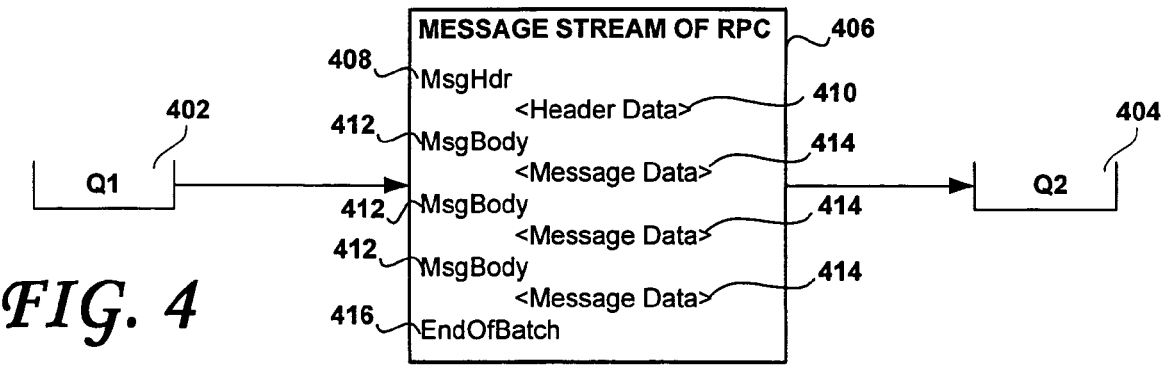
FIG. 4 shows a simplified exemplary structure of the streaming portion of an RPC according to an embodiment of the present invention that enables a plurality of messages to be sent from a source queue to a destination queue.
Figure 5:
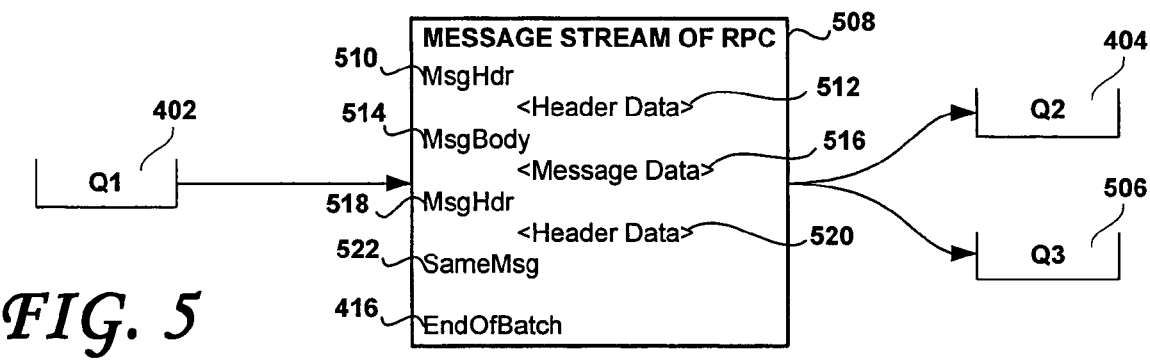
FIG. 5 shows a simplified exemplary structure of the streaming portion of an RPC according to an embodiment of the present invention that enables a same message to be sent from a source queue to more than one destination queue.
Figure 6:
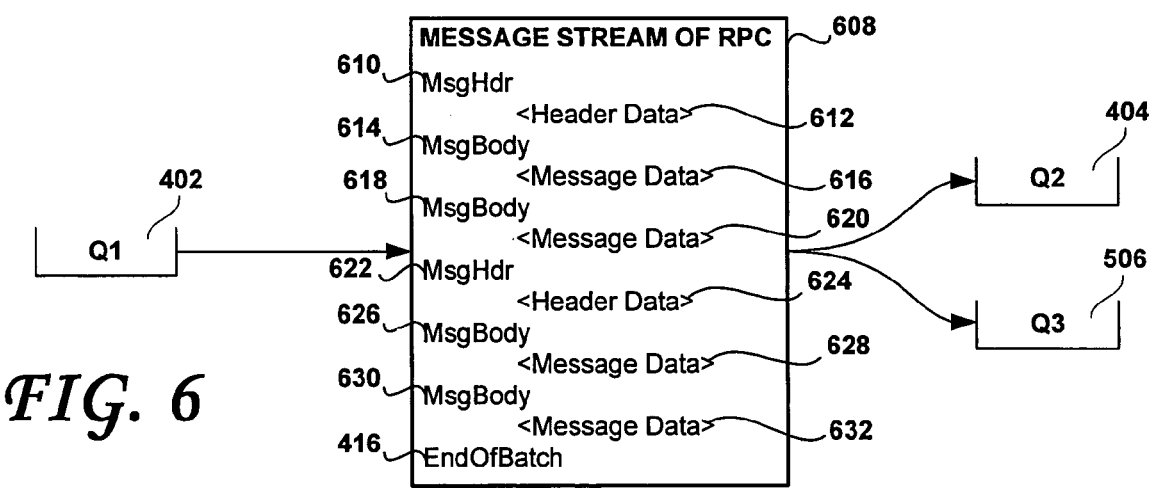
FIG. 6 shows a simplified exemplary structure of the streaming portion of an RPC according to an embodiment of the present invention that enables a plurality of messages to be sent from a source queue to more than one destination queue.

FIGS. 4-6 shows a structure of the streaming portion of RPCs according to embodiments of the present invention. The structure of FIG. 4 enables a plurality of messages to be sent from a source queue to a destination queue. The RPC 406 of FIG. 4 is sent from a source queue Q1 402 to a destination queue Q2 404. Under control of the source side, the propagator process (not shown in FIGS. 4-6) encapsulates a plurality of messages into the single RPC 406. In the example shown in FIG. 4, each of the plurality of messages is sent to a same destination queue Q2 404, although that need not be the case. The RPC 406 includes a MsgHdr status byte 408, which identifies the destination queue Q2 404 for the messages contained in the message following each of the MsgBody status byte in the RPC. The RPC 406 of FIG. 4 shows an example of multiple messages sent to the same destination queue Q2 404. According to an embodiment of the present invention, when multiple messages are to be sent to a same destination queue Q2 404, the queue header data 410 (which may include about 100 bytes of data, potentially involving character set conversions) is transmitted only once, after the MsgHdr status byte. After the header data 410, the RPC 406 may include one or more pairs of MsgBody status byte 412 and message data 414. In this manner, the message header data 410 need only be transmitted once for a plurality of messages destined for the same destination queue, or to multiple destination queues, as described relative to FIG. 5 below. For both buffered and persistent queue propagation, messages need only be sent once to the target database regardless of how many target queues are to receive the messages on the remote destination side. The byte savings inherent in this implementation of the present invention is, therefore, dependent on the size of the payload message data 414 and the number of destination remote queues to which the messages are to be sent.

For persistent queue propagation, each RPC conventionally translates into a separate SQL insert at the destination side. Persistent messages, as opposed to buffered queues, include those messages that constitute requests for service must be stored persistently and processed exactly once for deferred execution to work correctly in the presence of network, computer, and application failures. Message persistence is needed to preserve message metadata (contained in the header data 410 that is preceded by the MsgHdr status byte 408), which can be as important as the payload data. For example, the time that a message is received or dispatched can be crucial for business and legal reasons. For buffered or nonpersistent queues, the main enqueue driver at the destination side calls a buffered enqueue driver that stores enqueued messages in a group of shared memory structures that contain data and control information for one database instance, instead of a queue table as is the case with persistent queues. Messages in buffered queues may be spilled over to a queue table if they are not dequeued within a system-controlled period of time or if a specified memory threshold is exceeded. Nonpersistent queues are generally used to provide an asynchronous mechanism to send notifications to users that are currently connected to the instance of the database. Embodiments of the present invention have the advantage that, for persistent queue propagation, a single SQL insert statement executed at the destination queue can enqueue a batch of messages (each such message data 414 being preceded by a MsgBody status byte) using row callbacks.

FIG. 5 shows the streaming portion of an RPC according to an embodiment of the present invention that enables a same message to be sent from a source queue to more than one destination queues. FIG. 4 shows an RPC 508 configured to dequeue messages from a source queue Q1 402 to a first destination queue Q2 404 and to a second queue Q3 506 where the message data is to be enqueued. The RPC 508 includes a first MsgHdr status byte 510 and the corresponding first header data 512. The RPC 508 also includes message data 516 that is destined for the two separate queues on the destination side; namely, queue Q2 404 and queue Q3 506. The message data 516 destined for the two remote queues 404, 506 is preceded by the MsgBody status byte 514. The RPC 508 also includes a second message header status byte MsgHdr 518, followed by the second header data 520. As noted above, the presence of a message header status byte indicates the destination queue or a change in the destination queue. In this case, the first MsgHdr status bytes signals the destination that the header data to follow specifies the destination queue of the message to follow. In this example, the first header data 512 indicates that the message data 516 is to be enqueued in the first destination queue Q2 404. The presence of a second MsgHdr status byte signals to the destination that the header data to follow specifies a change in the destination queue for the message or messages to follow. In this case, the second header data 520 specifies that the message data to follow is to be enqueued in the second destination queue Q3 506.

The RPC 508 may, after the header data 520, include a second MsgBody status byte, followed by a copy of the message data 516. However, this would result in an unnecessarily large RPC in which multiple copies of identical messages were encapsulated, resulting in further inefficiencies. An embodiment of the present invention, therefore, makes use of a SameMsg status byte, shown in FIG. 5 at reference 522. The SameMsg status byte, as its name suggests, instructs the destination side to re-use the same message that follows the previous MsgBody status byte; namely, the message data 516. In this manner, when the source side determines that a same message is be propagated to two or more separate queues in a single RPC, the status byte SameMsg may be used, thereby obviating the need to transmit the same message information more than once between the source and destination queues. Using this protocol, messages need only be sent once to the target database, regardless of how many target queues (such as queues 404, 506) are to receive the message on the remote side. The byte savings is, therefore, dependent on the size of the payload (e.g., the message data 516) and the number of remote queues to which the payload is to be sent. An EndOfBatch token 416 signals the end of the message stream. As the size of the payload generally may be large relative to the size of the RPC's metadata (often several megabytes for the payload, as opposed to a few hundred bytes for the message or messages' metadata stored in the header data) the savings in memory at the destination side (e.g., the SQL insert memory), as well as the reduction in network traffic, is quite significant. As the streamed messages may be directly stored into the destination buffers, the amount of memory needed at the destination side is greatly decreased. Conventionally, for each RPC, it was necessary that a copy of the message be stored in an intermediate memory before the message was made available to the SQL engine, which also required a copy thereof in its internal buffers. In contrast, according to embodiments of the present invention, an intermediate copy of the messages need not be maintained and the messages need not be materialized ahead of time. The SQL engine, according to an embodiment of the present invention, is invoked only once per RPC. Thereafter, within that call, the source and destination sides may exchange the messages according to the streaming protocol shown and described herein. Accordingly, only a single instantiation of the message need be made at the destination side to make the necessary table inserts. By encapsulating messages that share common metadata into a single RPC and by only including one copy of each message irrespective of the number of destination queues of each message, embodiments of the present invention achieve important gains in efficiency, as compared to conventional RPC and methods of processing the same.

FIG. 6 shows a streaming portion of an RPC according to an embodiment of the present invention that enables a plurality of messages to be sent from a source queue to more than one destination queue. The RPC 608 includes a first MsgHdr status byte 610, followed by the corresponding first header data 612. For example, the first header data 612 may specify that the payload to follow is to be enqueued in the first destination queue Q2 404. In this case, the payload to be propagated to Q2 404 consists of two messages, shown in FIG. 6 as message data 612 and message data 616, preceded by MsgBody status bytes 614 and 618, respectively. A second message header status byte MsgHdr 622 follows, indicating a change in the destination queue for any messages to follow. The second header data 624 may specify that the payload to follow is to be enqueued in the second destination queue Q3 506. The payload to follow, in this illustrative embodiment, consists of two messages, shown in FIG. 6 as message data 628 and message data 632, preceded by MsgBody status bytes 626 and 630, respectively. An EndOfBatch token signals the end of the message stream to the destination side. Therefore, according to this protocol, a plurality of identical or different messages to be enqueued into a single or multiple destination queues may be encapsulated into a single remote procedure call.

Using this protocol, the SQL engine at the destination side need only be invoked once to process the inserts into the specified tables of the messages streamed from the source side. Once invoked, the destination side may utilize the metadata (i.e., the header information containing the table ID, an identification of the destination queue(s), and the like) that is common to all messages to be streamed, and prepare to execute the insert statements only once. Thereafter, the destination side may then repeatedly read the streamed messages into the destination buffers without incurring the computational overhead associated with repeatedly invoking the SQL engine and executing separate insert statements for each message propagated from the source to the destination side. The destination buffers, therefore, need only hold a single message (i.e., the buffers are re-used). Thus, there is memory savings in addition to the savings in computational overhead.

It is worthy of note that it is the source side that controls the message streaming protocol of the RPCs. That is, according to embodiments of the present invention, the destination side (i.e., where the streamed messages are to be enqueued) is not told a priori the number of messages to expect in the RPC it is processing. The source side uses the status bytes embedded in the message stream to alert the destination side of what to expect next (i.e., header data, message data, same message or end of batch, for example). The destination side repeatedly uses a call back to read the incoming streamed messages until it encounters the EndOfBatch token. This protocol uses the destination side's CPU resources sparingly. Indeed, the destination side avoids the computationally intensive task of repeatedly invoking the SQL engine to carry out a single table insert for each message it receives encapsulated in a single RPC. Moreover, according to an embodiment of the present invention, the destination side does not return the out arguments one at a time to the source side. Indeed, the out arguments (the result of the requested procedure based on the in arguments provided in the RPC) are propagated back to the source side together, only after all of the messages have been inserted into the appropriate tables, resulting in further efficiencies at the destination side.

Figure 7:
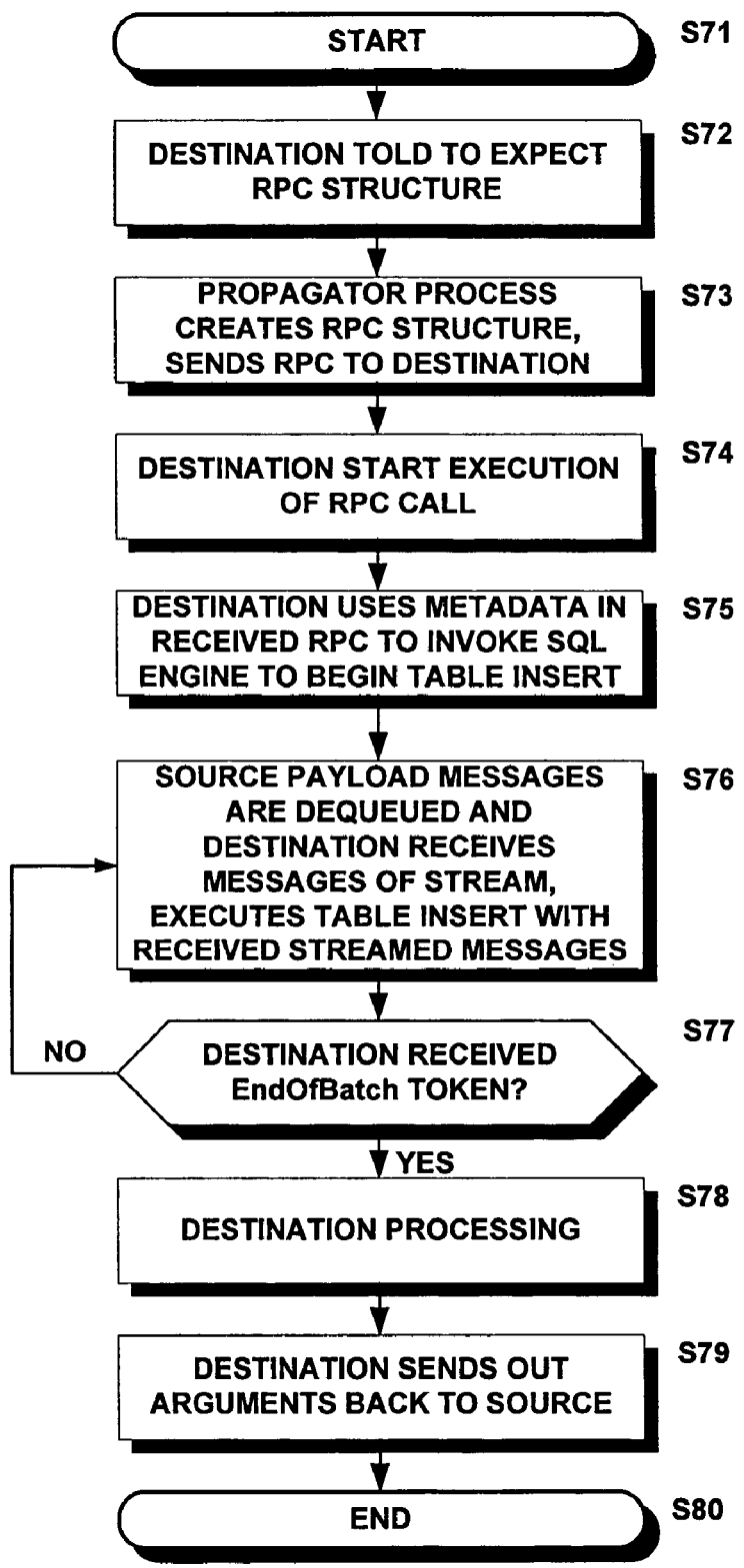
FIG. 7 is a flowchart that illustrates aspects of a method for streaming messages in an RPC, according to an embodiment of the present invention.

FIG. 7 is a flowchart that illustrates aspects of a method for streaming messages in an RPC, according to an embodiment of the present invention. The method begins at S71, whereupon the destination may be told to expect an RPC, as shown at S72. A process (such as the aforementioned propagator process, for example) creates an RPC structure encapsulating one or a plurality of messages bound for one or more remote queues and sends the RPC to the destination side, as shown at S73. The created RPC structure includes the metadata (a single instance thereof) of those messages to be propagated that share common metadata, and utilizes the status bytes and EndOfBatch token described above to enable streaming of the messages dequeued from the source queue. The destination side, using the metadata supplied by the RPC, begins the execution thereof, as shown at S74. That is, the SQL engine is invoked to begin and the necessary driver(s) invoked to begin carry out the necessary table inserts, as shown at S75. According to an embodiment of the present invention, only after the RPC has begun execution (using the common metadata) are the source messages (the actual payload of the RPC) dequeued from the source packaged as shown and described relative to FIGS. 4-6, streamed to and received at the destination side and the table inserts carried out (by a separate callback process for each row that is inserted) until an EndOfBatch token is received by the destination, as shown at S76 and S77. The destination may then process the function(s) specified by the RPC as shown at S78 and send the results (i.e., n out arguments, where n is equal to the number of messages encapsulated in the RPC) back to the source, as shown at S78 and S79. The method ends at S80.

Figure 8:
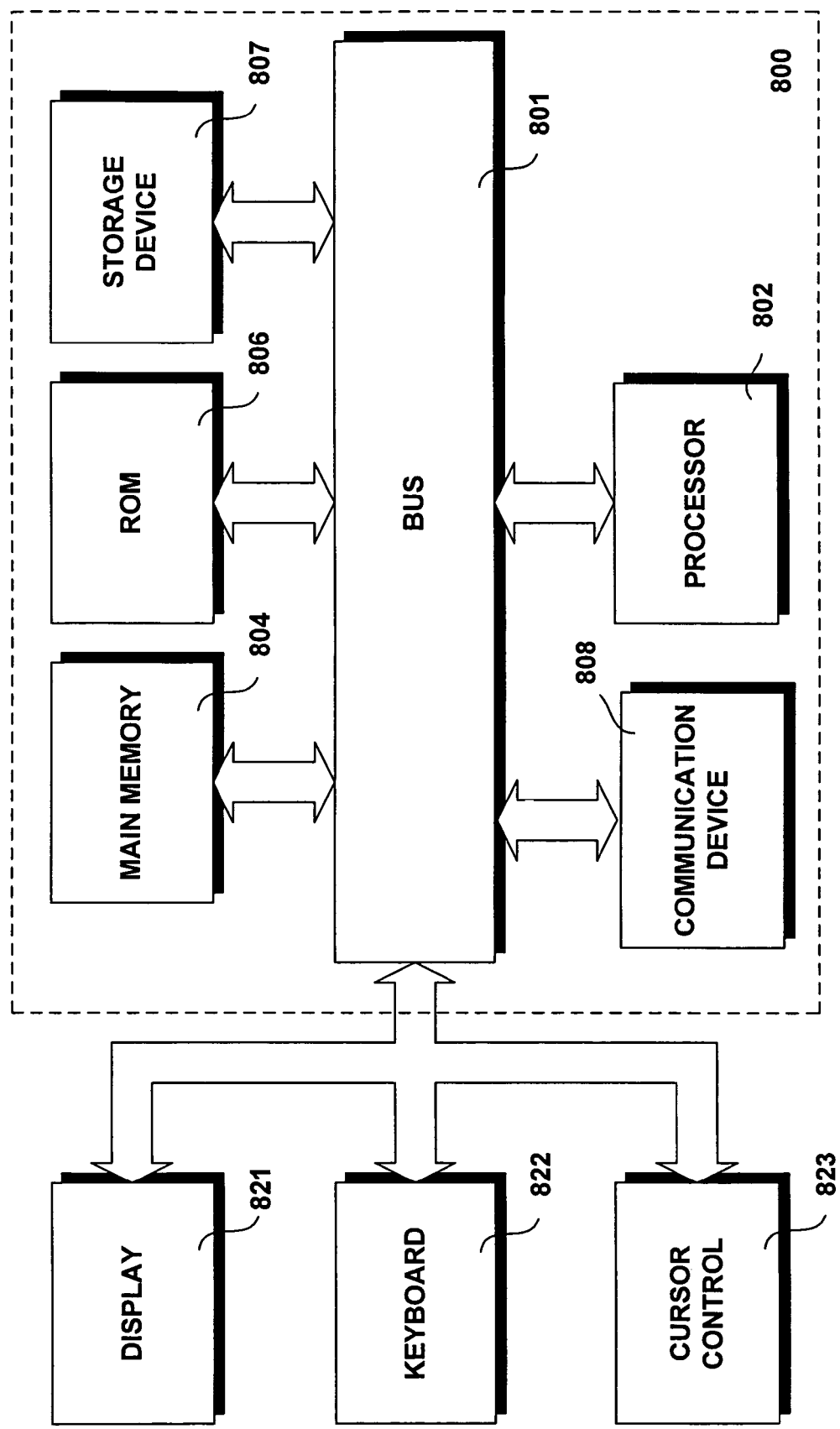
FIG. 8 is a block diagram of a computer with which aspects of embodiments of the present invention may be practiced.

FIG. 8 illustrates a block diagram of a computer system 800 upon which embodiments of the present inventions may be implemented. Computer system 800 includes a bus 801 or other communication mechanism for communicating information, and one or more processors 802 (one shown in FIG. 4) coupled with bus 801 for processing information. Computer system 800 further comprises a random access memory (RAM) or other dynamic storage device 804 (referred to as main memory), coupled to bus 801 for storing information and instructions to be executed by processor(s) 802. Main memory 804 also may be used for storing temporary variables or other intermediate information during execution of instructions by processor 802. Computer system 800 also includes a read only memory (ROM) and/or other static storage device 806 coupled to bus 801 for storing static information and instructions for processor 802. A data storage device 807, such as a magnetic disk or optical disk, is coupled to bus 801 for storing information and instructions. The computer system 800 may also be coupled via the bus 801 to a display device 821, such as a cathode ray tube (CRT), for displaying information to a computer user. An alphanumeric input device 822, including alphanumeric and other keys, is typically coupled to bus 801 for communicating information and command selections to processor(s) 802. Another type of user input device is cursor control 823, such as a mouse, a trackball, or cursor direction keys for communicating direction information and command selections to processor 802 and for controlling cursor movement on display 821.

The present invention is related to the use of computer system 800 and/or to a plurality of such computer systems to enable methods and systems for efficient streaming of messages from a source queue to a destination queue. According to one embodiment, the efficient streaming of messages in an remote procedure call described herein may be provided by one or more computer systems 800 in response to processor (s) 802 executing sequences of instructions contained in memory 804. Such instructions may be read into memory 804 from another computer-readable medium, such as data storage device 807. Execution of the sequences of instructions contained in memory 804 causes processor(s) 802 to perform the process steps that will be described hereafter. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method for enabling a single remote procedure call to stream of a plurality of messages from a source queue accessible by a first computer application to one or more selected remote destination queues accessible to a second computer application over a computer network, the computer-implemented method including steps of:
    signaling that an identity of a first destination queue for messages to be streamed within the single remote procedure call follows using a first message header indicator;
    identifying the first destination queue using first header data;
    signaling that a first message to be streamed to the first destination queue follows using a first message body indicator;
    streaming first message data to the first destination queue identified by the first header data, the first message data including the first message;
    signaling that a second message to be streamed within the single remote procedure call follows, using a second message body indicator;
    streaming second message data, the second message data including the second message to be streamed; signaling a change in destination queue for messages to follow using a second message header indicator; identifying a second destination queue using second header data; indicating that an immediately preceding message data is to be streamed to the second destination queue identified by the second header data using a same message indicator, and;
    signaling the end of the stream of the plurality of messages using an end of batch token.

2. The computer-implemented method of claim 1, wherein the second streaming step is configured to stream the second message to the first destination queue.

3. The computer-implemented method of claim 1, wherein the second streaming step is configured to stream the second message to a second destination queue.

4. The computer-implemented method of claim 3, further comprising:
    signaling a change in destination queue for the second message using a second message header indicator disposed between the first message data and the second message indicator, and
    identifying the second destination queue to which the second message is to be streamed using second header data.

5. A computer-readable medium having data stored thereon representing sequences of instructions which, when executed by a computing device, causes the computing device to enable a single remote procedure call to stream of a plurality of messages from a source queue accessible by a first computer application to one or more selected remote destination queues accessible to a second computer application over a computer network, the remote procedure call comprising:
    a first message header indicator, the first message header indicator being configured to signal that an identity of a first destination queue for messages to be streamed follows;
    first header data configured to identify the first destination queue;
    a first message body indicator, the first message body indicator being configured to signal that a first message of the plurality of messages within the single remote procedure call to be streamed to the first destination queue follows;
    first message data, the first message data including the first message to be streamed to the first destination queue identified by the first header data;
    a second message body indicator, the second message body indicator being configured to signal that a second message of the plurality of messages within the single remote procedure call to be streamed follows;
    second message data, the second message data including the second message to be streamed; a second message header indicator, the second message header indicator being configured to signal a change in destination queue for messages to follow; second header data configured to identify a second destination queue; a same message indicator, the same message indicator indicating that an immediately preceding message data is to be streamed to the second destination queue identified by the second header data, and;
    an end of batch token, the end of batch token signaling the end of the stream of the plurality of messages.

6. The computer-readable medium of claim 5, wherein the remote procedure call is configured to stream the second message to the first destination queue.

7. The computer-readable medium of claim 5, wherein the remote procedure call is configured to stream the second message to a second destination queue.

8. The computer-readable medium of claim 7, further comprising:
    a second message header destination indicator, the second message header destination indicator being disposed between the first message data and the second message body indicator, the second message header destination indicator being configured to signal a change in destination queue for the second message, and
    second header data configured to identify the second destination queue to which the second message is to be streamed.

9. A computer-implemented method of streaming a plurality of messages from a source queue to at least one destination queue over a computer network, each of the plurality of messages including metadata and message data, the method comprising the steps of:
    generating a single remote procedure call for the plurality of messages, the remote procedure being configured to encapsulate at least header data, message data for each of the plurality of messages and an end of batch token, the header data being common to each of the plurality of messages and including an identification of the at least one destination queue, the end of batch token signaling that no further message data follow, the single remote procedure call further including a second message header indicator configured to signal a change in destination queue for messages to follow; the remote procedure call being further configured to identify a second destination queue using second header data, and to indicate that an immediately preceding message data is to be streamed to the second destination queue identified by the second header data using a same message indicator;

sending the generated single remote procedure call over the computer network to the destination queue identified in the header data, and beginning execution of the single remote procedure call by invoking a Structured Query Language (SQL) engine and initiating a single insert statement to enqueue each of the streamed message data into the at least one destination queue identified by the header data during execution of the single remote procedure call, and dequeueing at least the message data for each of the plurality of messages from the source queue and streaming the dequeued messages over the network, and successively enqueueing each streamed message data into the at least one destination queue identified by the header data until the end of batch token is received.

10. The computer-implemented method of claim 9, further comprising a step of configuring the remote procedure call so as to include only one copy of a message data that is to be sent to more than one destination queue.

11. The computer-implemented method 9, further comprising a step of configuring the remote procedure call such that a message header indicator and header data precedes each group of message data to be streamed to a same destination queue.

12. The computer-implemented method of claim 9, wherein the streaming step is carried out only after the SQL engine has been invoked and the single insert statement initiated.

13. The computer-implemented method of claim 9, further including executing a callback to carry out a row insert for each streamed message data, a memory holding each streamed message data being a SQL insert memory.

14. The computer-implemented method of claim 9, wherein a number of message data streamed to the destination is unknown to the destination queue until the end of batch token is received.

* * * * *

UNITED STATES PATENT AND TRADEMARK OFFICE
CERTIFICATE OF CORRECTION

| | | |
|---|---|---|
| PATENT NO. | : 7,546,613 B2 | Page 1 of 1 |
| APPLICATION NO. | : 10/942118 | |
| DATED | : June 9, 2009 | |
| INVENTOR(S) | : Nancy Reiko Ikeda et al. | |

It is certified that error appears in the above-identified patent and that said Letters Patent is hereby corrected as shown below:

In column 11, line 1, delete "an" and insert -- a --, therefor.

In column 11, line 53, in claim 1, delete ",and;" and insert -- ;and --, therefor.

In column 12, line 39, in claim 5, delete ",and;" insert -- ;and --, therefor.

In column 14, line 7, in claim 11, after "method" insert -- of claim --.

Signed and Sealed this

First Day of June, 2010

David J. Kappos
*Director of the United States Patent and Trademark Office*